June 13, 1967  S. H. BINGHAM  3,325,126
MOTOR MOUNTING MEANS

Filed June 20, 1966  2 Sheets-Sheet 1

INVENTOR
SIDNEY H. BINGHAM

BY Darby & Darby
ATTORNEYS

June 13, 1967  S. H. BINGHAM  3,325,126
MOTOR MOUNTING MEANS

Filed June 20, 1966  2 Sheets-Sheet 2

INVENTOR
SIDNEY H. BINGHAM
BY *Darby & Darby*
ATTORNEYS

United States Patent Office 3,325,126
Patented June 13, 1967

3,325,126
MOTOR MOUNTING MEANS
Sidney H. Bingham, 109 E. 35th St.,
New York, N.Y. 10016
Filed June 20, 1966, Ser. No. 558,751
7 Claims. (Cl. 248—2)

The present invention relates to means for mounting motors, particularly electrical motors, on structural elements from which the motors are supported.

More particularly still, the invention relates to the mounting of electrical motors upon the gear housings which are in turn mounted on the trucks of railway cars and the like transportation equipment.

It is desirable that the motor shaft be connected to the shaft of the gear transmission or other driving shaft through the medium of a flexible coupling, and likewise desirable that the motor be mounted on the gear box by means of a resilient mounting in order that movement of the motor about its center be permitted both to absorb torque and compressive shock.

My invention provides a novel means for mounting a motor on a structural element, be it gear transmission or shaft bearing housing, in such a manner as to provide a cushioned support for the motor giving resilience both in vertical load and in torque.

It is therefore an object of the invention to provide a motor mounting means which cushions the motor both against vertical load and against torque.

It is another object of the invention to provide such cushioned mounting means which is inexpensive and readily constructed and which is at the same time more effective in its cushioning function than any mounting means presently in use.

Other objects and features of the invention will become apparent when the following description is considered in connection with the annexed drawings in which—

Figure 1:
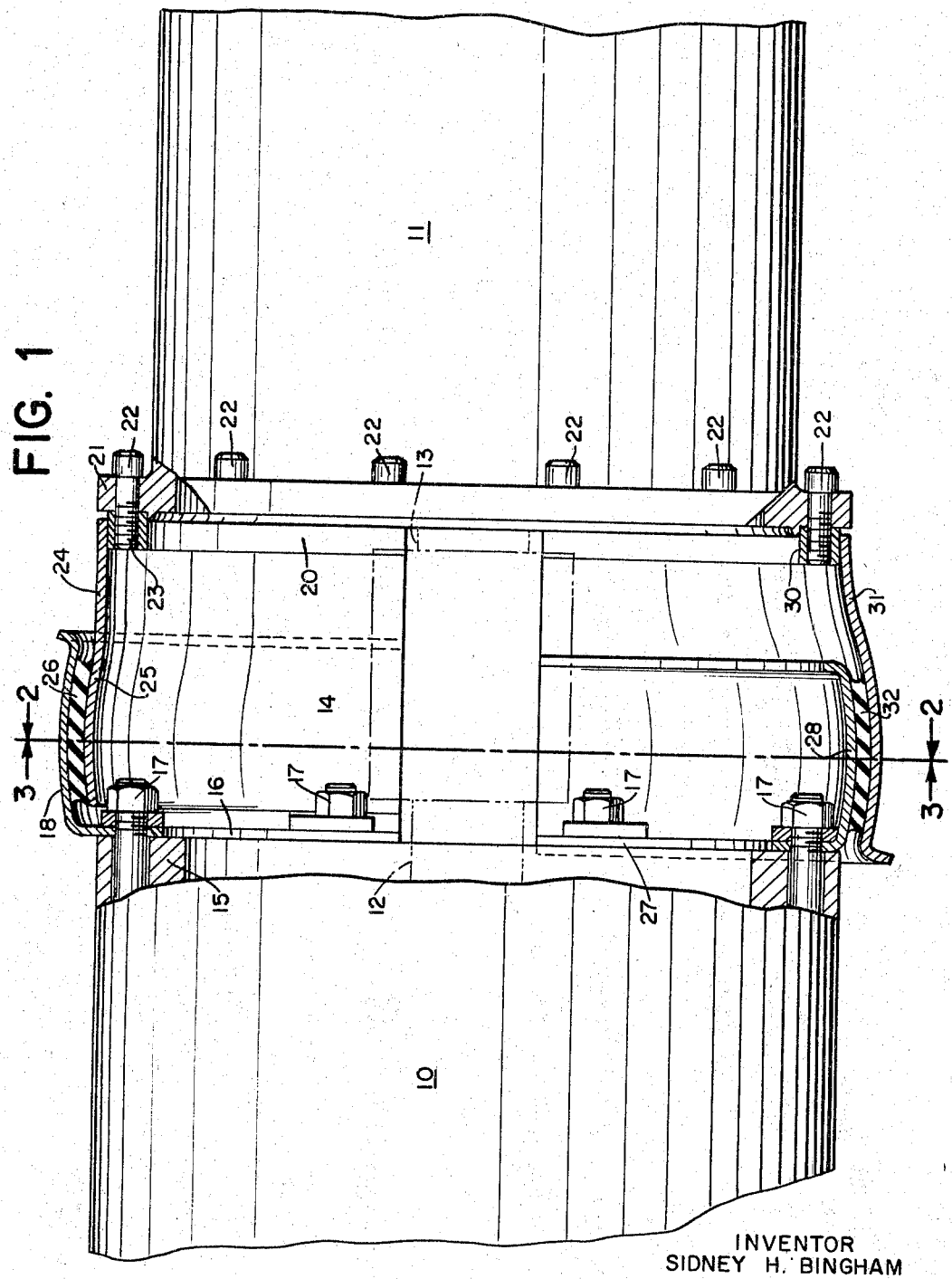
FIGURE 1 is a vertical cross-sectional view showing the mounting means of my invention mounted on a gear housing and mounting a motor thereto.
Figure 2:
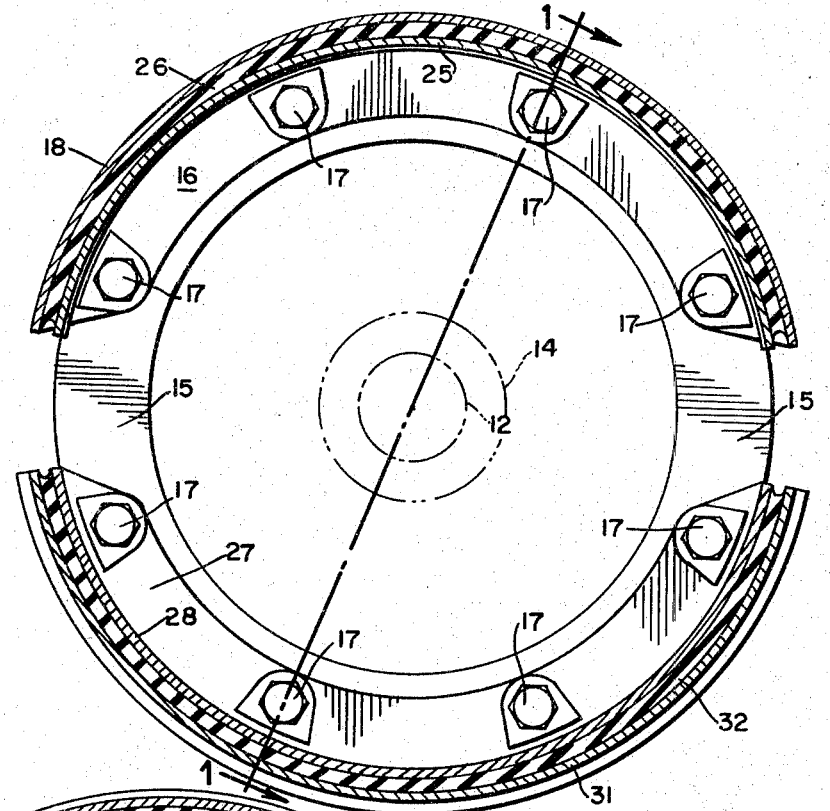
FIGURE 2 is a transverse vertical cross-sectional view showing the attachment of the motor mounting means to the motor.
Figure 3:
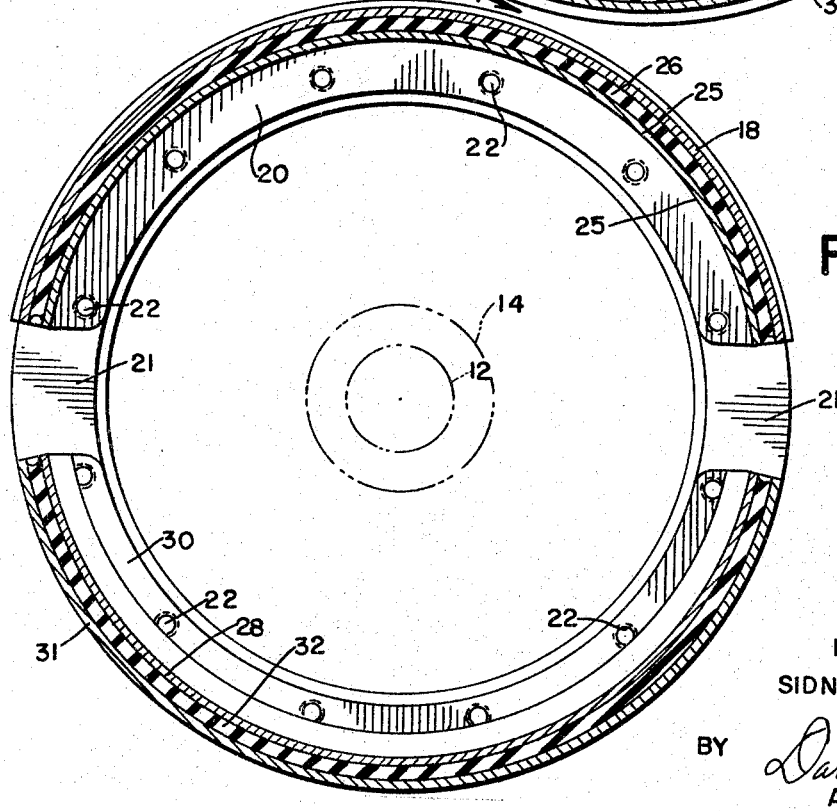
FIGURE 3 is a similar vertical cross-sectional view showing the attachment of the motor mounting means to the supporting gear housing.

Referring now to the drawings and particularly to FIGURE 1 thereof, the motor is shown at 10 and the gear housing at 11, the motor shaft 12 being connected to the input shaft to the gear train 13 by means of a flexible coupling 14.

Mounted on the end plate 15 of the motor is a substantially semi-circular ring 16, this mounting being by means of the usual mounting bolts and nuts 17. The ring 16 has a flange portion 18 thereof which is preferably bent in the general form of a portion of a sphere as is clearly indicated in FIGURE 1.

In a similar manner a ring 20 is affixed to the end plate or flange 21 of the gear housing 11, this being done by means of the bolts 22 threaded into portions 23 of the ring 21. Integral with or affixed to the half ring 21 is the flange 24 which at is left-hand end is formed in the shape of a portion of a sphere matching the shape of the flange 18 of the half ring 16.

Bonded to the lower surface of the flange 18 and to the supper surface of the portion 25 of ring 24 is a rubber member 26 which is preferably a synthetic polymer rubber.

In a similar manner a ring portion 27 is affixed to the lower part of the motor end plate 15 by means of the nuts 17, this member 27 being exactly similar to the member 16, save that it is of lesser radius and extends within rather than outside a corresponding member mounted on the gear housing 11, as will appear. The integral flange portion 28 of the member 27 extends to the right and is formed in the shape of a portion of a spherical surface.

Mounted on the flange 21 of the gear housing is a ring 30 similar to the ring 21 and mounted in the same manner by use of the bolts 22. The member 30 has formed therewith or welded thereto an axially extending member 31 which corresponds to member 24 and is at its outer end bent into the form of a portion of the surface of a sphere matching the shape of the portion 28. Placed between and bonded to the facing surfaces of members 28 and 31 is a rubber member 32 similar to the member 26. The rubber members may be natural rubber but are preferably synthetic polymers such as butadiene, styrene copolymers, and polyisobutalene, and are bonded to the metal by means of epoxy resin adhesives.

It will be noted that the upper member 18 is affixed to the motor 10 with the upper member 24, affixed to the gear housing, extending within it whereas the lower member 28 affixed to the motor extends within the lower member 31 affixed to the gear housing.

As a result of this arrangement the rubber members 26 and 32 are both in compression as respects the vertical load of the motor.

Since the center of gravity of the motor is offset with respect to the mounting means, the motor exerts a moment around the center of the mount due to which the rubber members 26 and 32 are subjected to shear forces which cause deflection of the rubber members. Likewise, any torsional force applied to the motor is presented to the rubber members as a shear stress and taken up by the rubber resisting such stress.

It will be seen that the construction described provides a cushion support for the motor 10 which provides resilience both in vertical load and in torque. It will furthermore be seen that the construction described provides a motor mounting having the characteristics of a resilient ball joint and thus provides an extremely desirable mode of mounting a motor which is connected to an output shaft by means of a flexible coupling.

Although I have described the mating members 18 and 26 as being shaped to conform to the surface of a portion of a sphere, it will be understood that cylindrical members might be utilized, although spherical sections are preferable.

Further, although a specific embodiment of my invention has been described, it will be understood that many modifications might be made and I wish therefore to be limited not by the foregoing description but on the contrary, solely by the claims granted to me.

What is claimed is:

1. In combination, a motor having a shaft, a gear transmission having a housing, a flexible coupling connecting said shaft and transmission, and means for mounting said motor on the transmission housing comprising a first pair of generally semicircular members mounted on the motor substantially concentric with said shaft, a second pair of generally semicircular members mounted on the transmission housing, each of said first pair of members having a surface facing a surface on each of said second pair of members, and resilient means between said facing surfaces connecting them together.

2. The combination according to claim 1, in which each member of said first and second pairs of members comprise first and second webs substantially at right angles to each other, said first webs being mounted on the motor and transmission housing respectively, and said second webs comprising the surfaces connected by said resilient means.

3. The combination according to claim 2, in which one of said first pair of members lies radially inwardly of its facing member and the other one of said first pair of members lies radially outwardly of its facing member.

4. The combination according to claim 3, in which one pair of resiliently connected members is positioned above the other pair of resiliently connected members, whereby said resilient means will be in compression under a vertical load and in shear under a torsional load.

5. The combination according to claim 4, in which each of said second webs is curved outwardly and longitudinally of the motor shaft and is bonded to the resilient means with epoxy resin adhesive.

6. The combination according to claim 1, in which the resilient means are rubber.

7. The combination according to claim 1, in which the resilient means are a synthetic polymer.

References Cited

UNITED STATES PATENTS

| | | | |
|---|---|---|---|
| 1,159,799 | 11/1915 | Roberts | 248—358 X |
| 1,703,297 | 2/1929 | Chase | 248—358 X |
| 2,365,421 | 12/1944 | Lord | 248—5 |
| 2,437,206 | 3/1948 | Neher | 248—358 |
| 2,457,706 | 12/1948 | Neher | 248—358 |

CHANCELLOR E. HARRIS, *Primary Examiner.*

JOHN PETO, *Examiner.*